(12) United States Patent
Wu et al.

(10) Patent No.: US 9,117,604 B2
(45) Date of Patent: Aug. 25, 2015

(54) SWITCH MECHANISM FOR ACTIVATING A SWITCH WHILE A DISPLAY MODULE PIVOTS RELATIVE TO A HOST MODULE AND PORTABLE ELECTRONIC DEVICE THEREWITH

(71) Applicant: Wistron Corporation, New Tiapei (TW)

(72) Inventors: Jing-Tang Wu, New Taipei (TW); Ming-Hsi Lee, New Taipei (TW); Liang Yu, New Taipei (TW); Pao-Chuan Wang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 295 days.

(21) Appl. No.: 13/919,006

(22) Filed: Jun. 17, 2013

(65) Prior Publication Data
US 2014/0048393 A1 Feb. 20, 2014

(30) Foreign Application Priority Data

Aug. 15, 2012 (TW) .............................. 101129473 A (51) Int. Cl.
*H01H 21/18* (2006.01)
(52) U.S. Cl.
CPC ..................................... *H01H 21/18* (2013.01)

(58) Field of Classification Search
CPC ........ G06F 1/1666; G06F 1/1616; H01H 21/18
USPC ........ 200/61.39, 61.62, 5 A, 5 R, 61.7–61.73; 361/679.01, 679.02, 679.27, 679.3, 361/679.08
See application file for complete search history.

(56) References Cited

U.S. PATENT DOCUMENTS

| 6,191,938 B1 * | 2/2001 | Ohgami et al. ............ 200/61.73 |
| 6,529,370 B1 * | 3/2003 | Kamishima ................... 200/5 A |
| 7,184,263 B1 | 2/2007 | Maskatia |
| 2003/0133261 A1 * | 7/2003 | Minaguchi et al. ........ 200/61.73 |

* cited by examiner

*Primary Examiner* — Amy Cohen Johnson
*Assistant Examiner* — Marina Fishman
(74) *Attorney, Agent, or Firm* — Winston Hsu; Scott Margo (57) ABSTRACT

A switch mechanism includes a sliding track disposed inside a host module, and a sliding component. An end of the sliding component is pivotally connected to a display module and the other end of the sliding component is slidably installed inside the sliding track. The sliding component slides in a first direction relative to the sliding track while the display module pivots in a first rotary direction relative to the host module. The switch mechanism further includes an activation component for moving to a first position corresponding to a first switch component to activate a first switch component while the sliding component slides in the first direction.

20 Claims, 12 Drawing Sheets

SWITCH MECHANISM FOR ACTIVATING A SWITCH WHILE A DISPLAY MODULE PIVOTS RELATIVE TO A HOST MODULE AND PORTABLE ELECTRONIC DEVICE THEREWITH

BACKGROUND OF THE INVENTION

1. Field of the Invention

The invention relates to a switch mechanism and a portable electronic device, and more specifically, to a switch mechanism for activating a switch while a display module pivots relative to a host module and a portable electronic device having the switch mechanism.

2. Description of the Prior Art

An operation system of a conventional notebook can switch to a suspend state or a power-off state while a display module and a host module are closed. An operation principle is to dispose a set of Hall effect switches on lateral sides of the display module, and the set of the Hall effect switches can be activated when an angle between the host module and the display module is less than a predetermined angle, so that the operation system can switch to the suspend state or the power-off state. However, as the notebook becomes smaller and slimmer, a space for accommodating the Hall Effect switches inside the display module is getting smaller, resulting in difficulty of mechanical design. In addition, when an appearance component of the notebook is made of a non-plastic material, such as metal material, magnetic field intensity of the Hall effect switch will be affected, so as to affect accuracy of the angle between the display module and the host module for the operation system to switch to the suspend state or the power-off state.

SUMMARY OF THE INVENTION

The present invention is to provide a switch mechanism for activating a switch while a display module pivots relative to a host module and a portable electronic device having the switch mechanism.

According to the disclosure, a switch mechanism includes a sliding track disposed inside a host module, and a sliding component. An end of the sliding component is pivotally connected to a display module and the other end of the sliding component is slidably installed inside the sliding track. The sliding component slides in a first direction relative to the sliding track while the display module pivots in a first rotary direction relative to the host module. The switch mechanism further includes an activation component for moving to a first position corresponding to a first switch component to activate a first switch component while the sliding component slides in the first direction.

According to the disclosure, the activation component is disposed on the sliding component, and a first groove is formed on the sliding track for containing the first switch component.

According to the disclosure, a second groove is further formed on the sliding track for containing a second switch component, and the activation component moves to a second position corresponding to the second switch component to activate the second switch component while the sliding component slides in the first direction.

According to the disclosure, the sliding component includes a pushing portion, and the switch mechanism further includes a linkage rod and a resilient component. A protruding structure is formed on a side of the linkage rod, the activation component is disposed on the other side of the linkage rod, and the pushing portion contacts against the linkage rod. The resilient component is connected to an end of the linkage rod, the resilient component drives the linkage rod as the sliding component moves in the first direction and separates from the linkage rod, and the pushing portion of the sliding component is for pushing the protruding structure of the linkage rod, so as to drive the activation component to activate the first switch component.

According to the disclosure, the resilient component forces the linkage rod in the first direction as the sliding component moves in the first direction and separates from the linkage rod and the pushing portion pushes the protruding structure of the linkage rod, and the pushing portion forces the linkage rod, so that the activation component activates the first switch component in a second direction.

According to the disclosure, the first direction is substantially vertical to the second direction.

According to the disclosure, the switch mechanism further includes a stop portion for stopping the other end of the linkage rod after the activation component activates the first switch component, so that the pushing portion of the sliding component does not contact the protruding structure of the linkage rod as the display module pivots in a second rotary direction relative to the host module and the sliding component slides in a direction opposite to the first direction.

According to the disclosure, an actuating portion is disposed on the sliding component, a first groove is formed on the sliding track for containing a second switch component, and the actuating portion moves to a second position corresponding to the second switch component to activate the second switch component while the sliding component slides in the first direction.

According to the disclosure, a guiding pillar is disposed on the host module, and a slot is formed on the linkage rod for containing the guiding pillar for guiding a movement of the linkage rod.

According to the disclosure, the sliding component comprises at least one wheel contacting against an inner side of the sliding track.

According to the disclosure, a portable electronic device includes a host module, a display module, a first switch component, and a switch mechanism. The display module is pivoted to the host module. The first switch component is installed inside the host module. The switch mechanism is for activating the first switch component while the display module pivots relative to the host module. The switch mechanism includes a sliding track disposed inside the host module, and a sliding component. An end of the sliding component is pivotally connected to the display module and the other end of the sliding component is slidably installed inside the sliding track. The sliding component slides in a first direction relative to the sliding track while the display module pivots in a first rotary direction relative to the host module. The switch mechanism further includes an activation component for moving to a first position corresponding to the first switch component to activate the first switch component while the sliding component slides in the first direction.

According to the disclosure, the portable electronic device further includes at least one rotating component, an end of the at least one rotating component being fixed on the display module and the other end of the at least one rotating component being pivotally connected to the sliding component, and the at least one rotating component being for driving the sliding component to slide inside the sliding track as the display module pivots relative to the host module.

According to the disclosure, the portable electronic device further includes a supporting arm, an end of the supporting arm being pivotally connected to the display module and the other end of the supporting arm being pivotally connected to the host module, so that the display module pivots relative to the host module.

The switch mechanism and the portable electronic device therewith can switch a system of the portable electronic device into different states, such as the suspend state, the power-off state and the power-on state, by pivoting the display module relative to the host module to a predetermined angle. Because the activation component and the actuating portion of the switch mechanism are disposed inside the host module instead of the display module, so that it can save a limited mechanical space of the display module. In addition, because both the activation component and switch components are disposed in the host module, the predetermined activating angle of the switch components is not affected by material of the portable electronic device, so as to activate the switch components more accurately to improve lack of accuracy of activation as the casing of the notebook computer is made of non-plastic material, such as metal, to affect the magnetic field intensity of the Hall effect sensor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
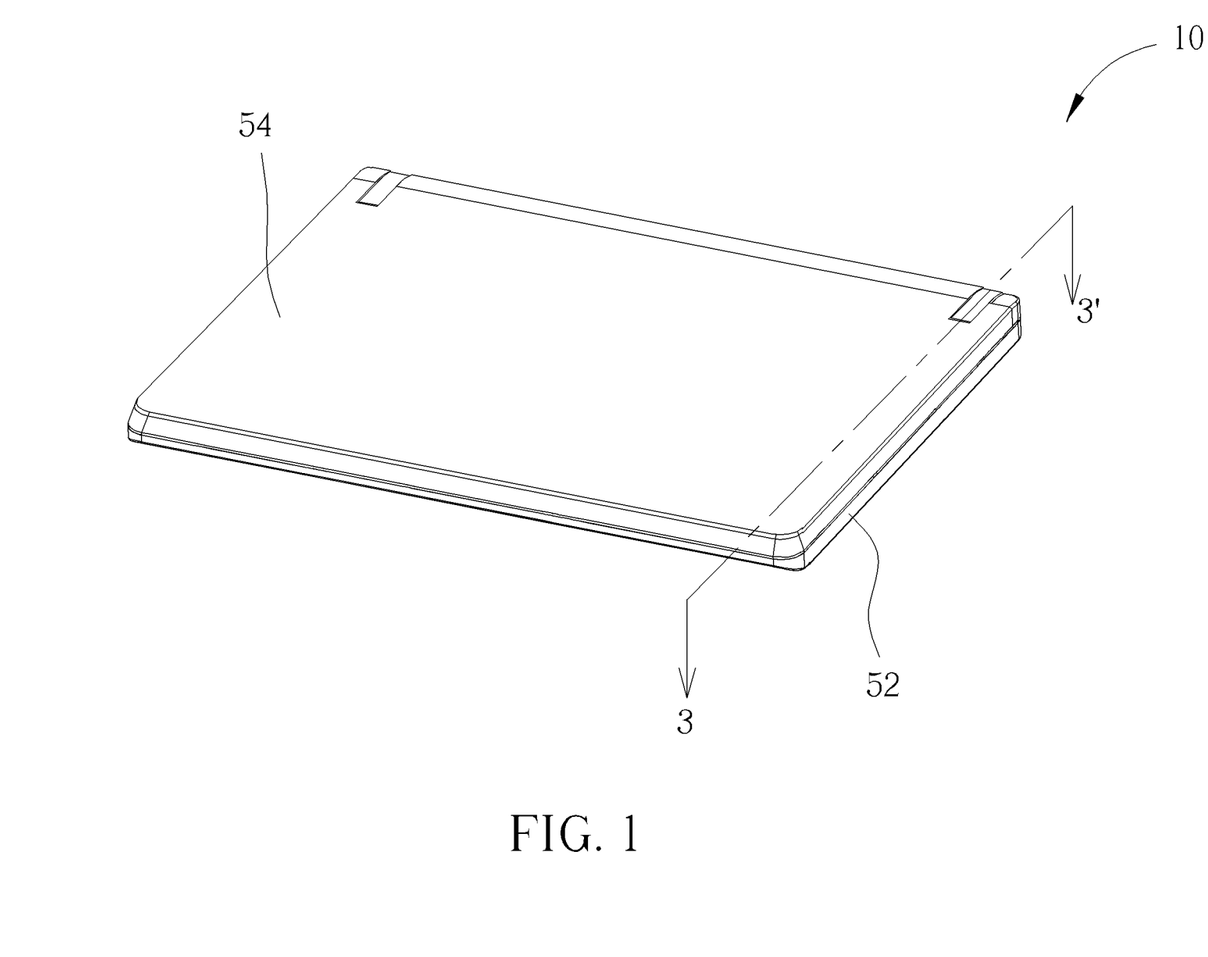
FIG. 1 and FIG. 2 are respectively diagrams of a portable electronic device in different states according to an embodiment of the present invention.
Figure 2:
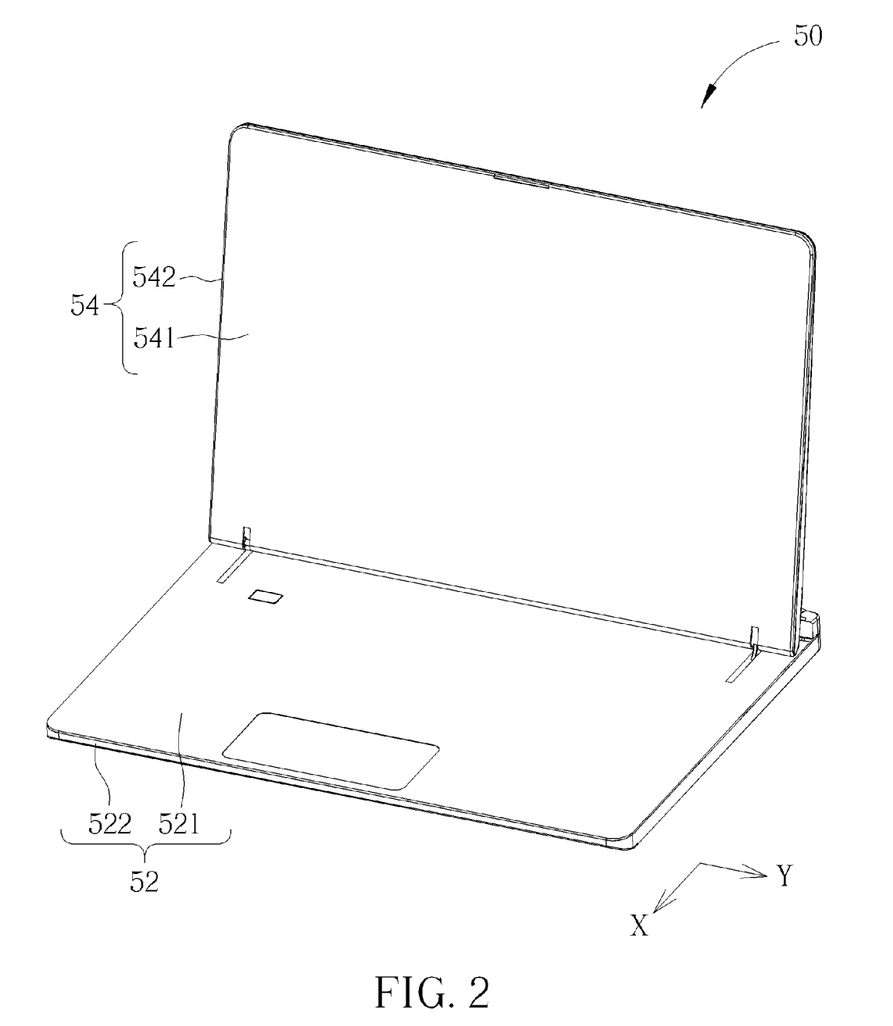
Figure 3:
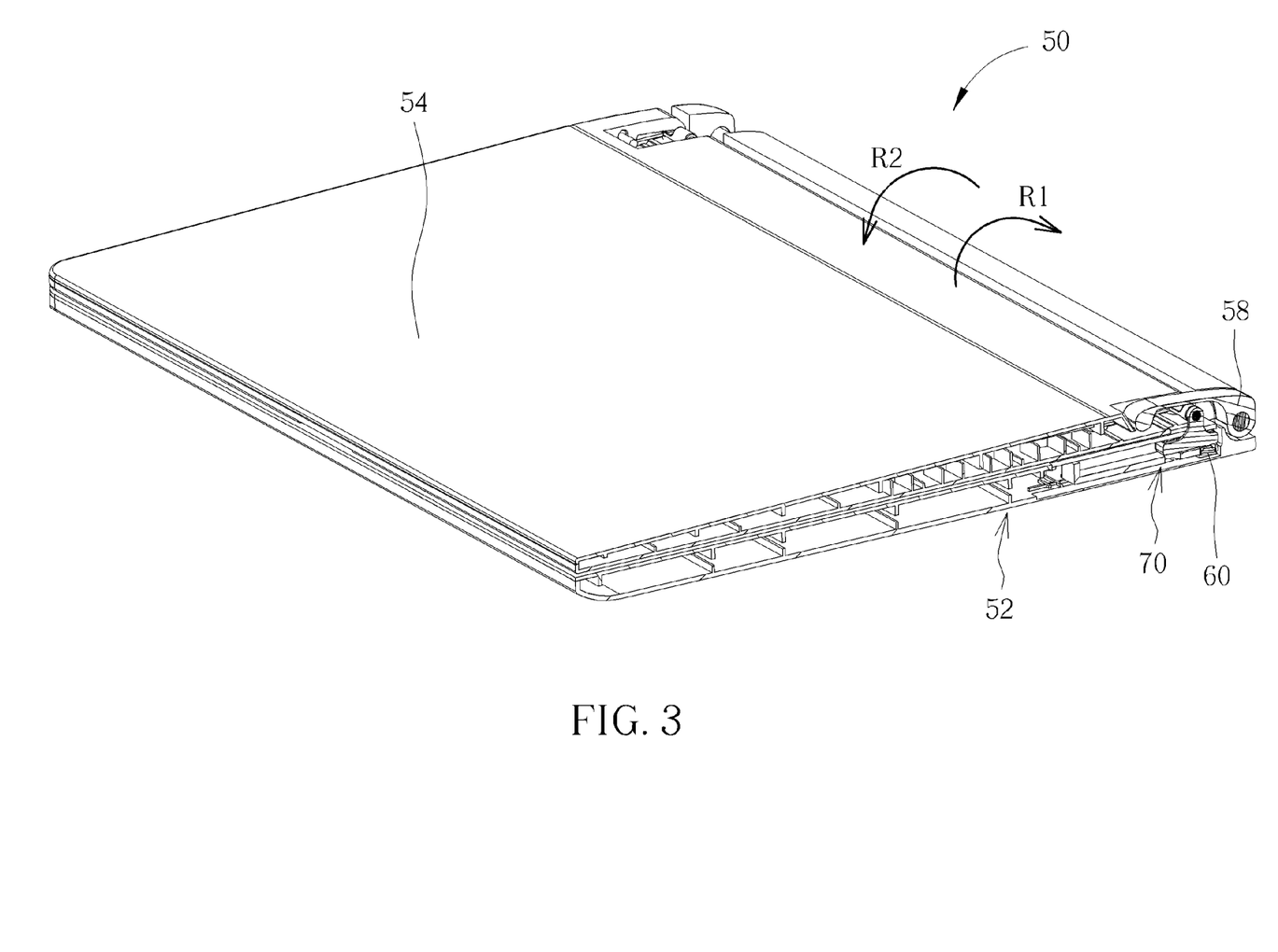
FIG. 3 is a sectional view of the portable electronic device along section line 3-3' illustrated in FIG. 1 according to the embodiment of the present invention.
Figure 4:
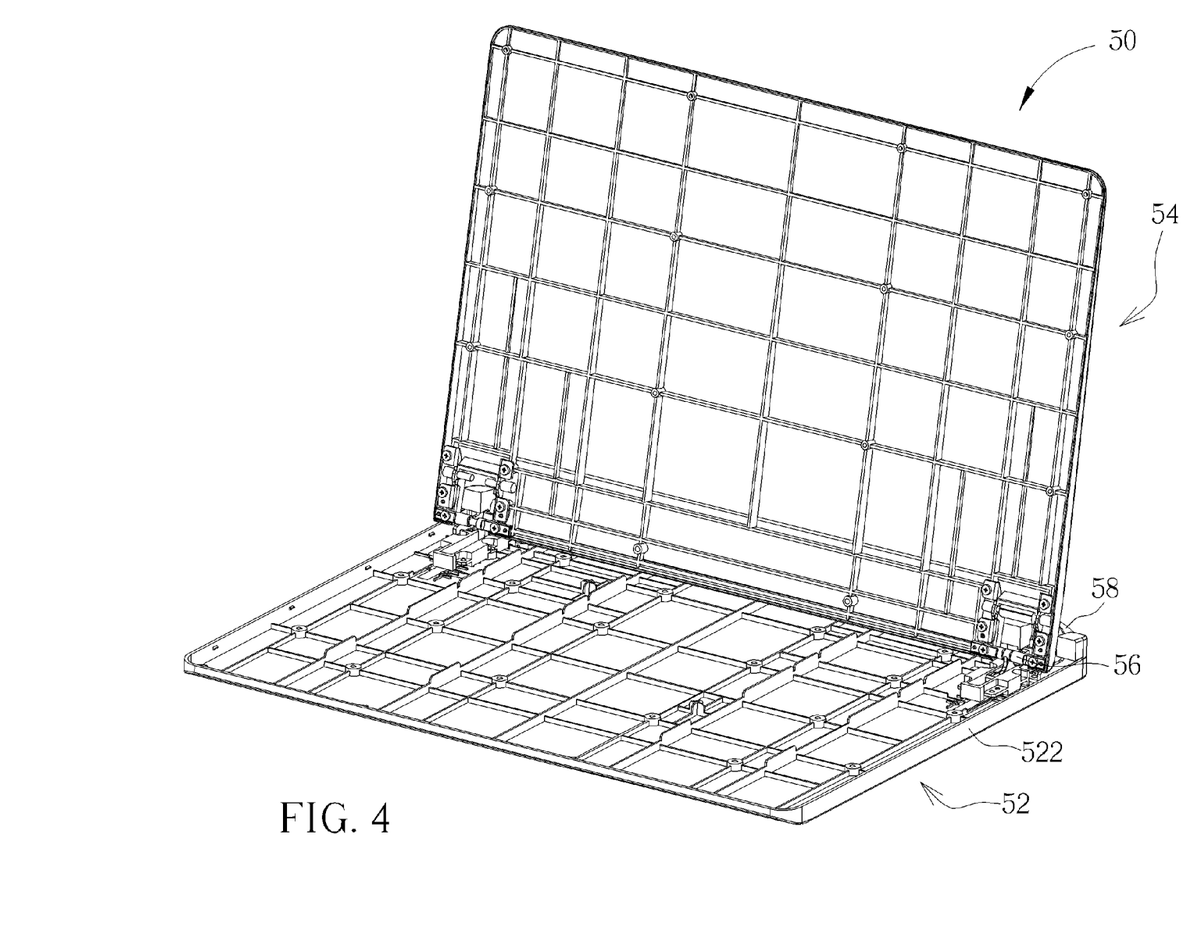
FIG. 4 is an inner structural diagram of the portable electronic device illustrated in FIG. 2 according to the embodiment of the present invention.

Please refer to FIG. 1 to FIG. 4. FIG. 1 and FIG. 2 are respectively diagrams of a portable electronic device 50 in different states according to an embodiment of the present invention. FIG. 3 is a sectional view of the portable electronic device 50 along section line 3-3' illustrated in FIG. 1 according to the embodiment of the present invention. FIG. 4 is an inner structural diagram of the portable electronic device 50 illustrated in FIG. 2 according to the embodiment of the present invention. The portable electronic device 50 of the present invention can be a notebook computer, and so on. The portable electronic device 50 includes a host module 52. The host module 52 includes an upper casing 521 and a lower casing 522, and a combination of the upper casing 521 and the lower casing 522 can cover internal electronic components, such as a CPU, RAMs, an optical drive, a graphic card, connectors, and so on. The portable electronic device 50 further includes a display module 54. The display module 54 includes a front cover 541 and a rear cover 542. The display module 54 is pivoted to the host module 52 and can display information processed by the host module 52.

In FIG. 1, the display module 54 pivots relative to the host module 52 to a closed state. In addition, in FIG. 2, the display module 54 pivots relative to the host module 52 to an opening state, so as to facilitate users to operate the notebook computer with a keyboard. Furthermore, in FIG. 3 and FIG. 4, the portable electronic device 50 further includes a rotating component 56, a supporting arm 58, a first switch component 60 and a switch mechanism 70. An end of the supporting arm 58 is pivotally connected to the display module 54, and the other end of the supporting arm 58 is pivotally connected to the host module 52, so that the display module 54 can pivot relative to the host module 52. The first switch component 60 is installed inside the host module 52. The first switch component 60 can be a tact switch, a Hall Effect switch, and so on. The switch mechanism 70 is for activating the first switch component 60 while the display module 54 pivots relative to the host module 52.

Figure 5:
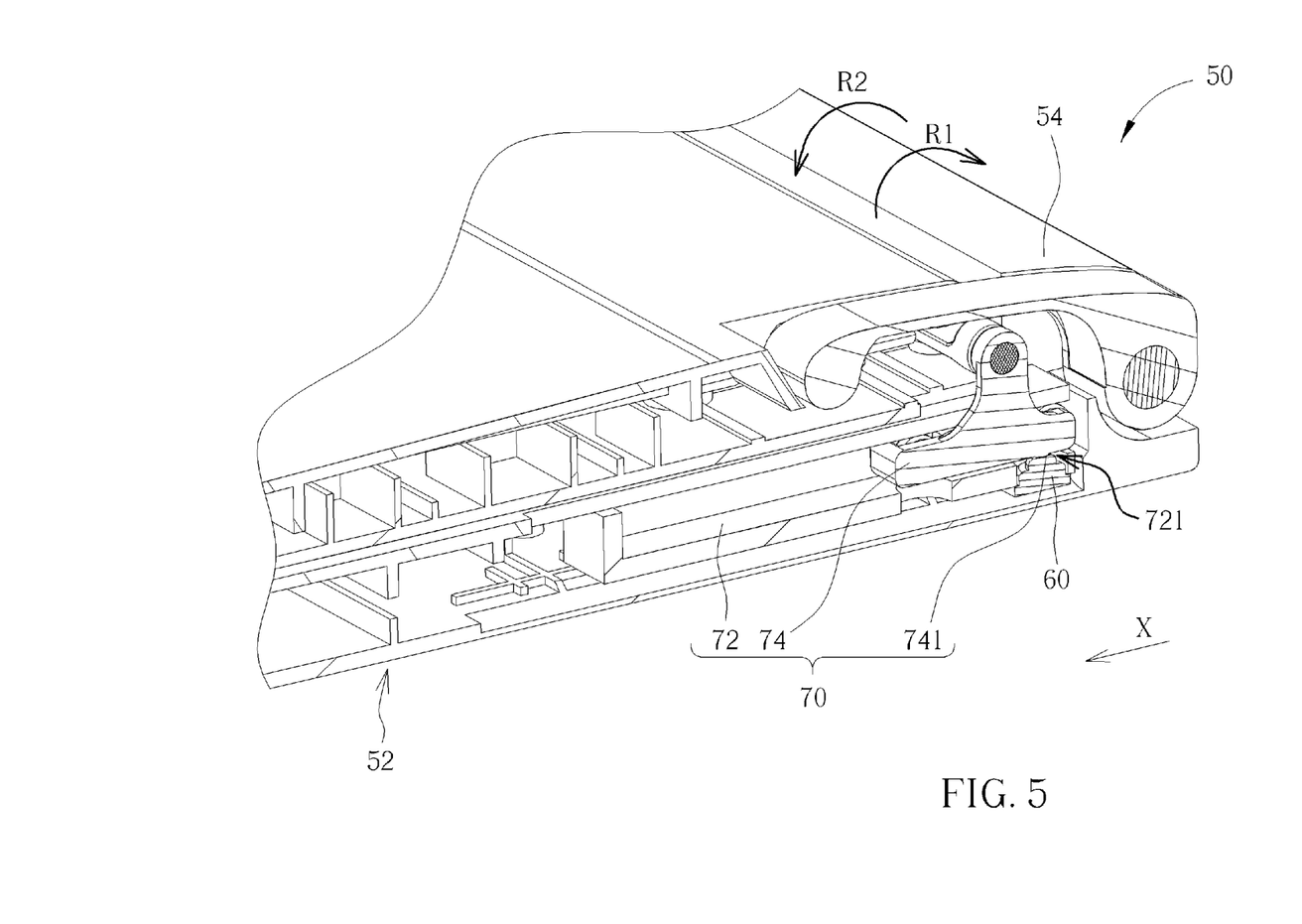
FIG. 5 and FIG. 6 are respectively partial enlarged diagrams of FIG. 3 and FIG. 4 according to the embodiment of the present invention.
Figure 6:
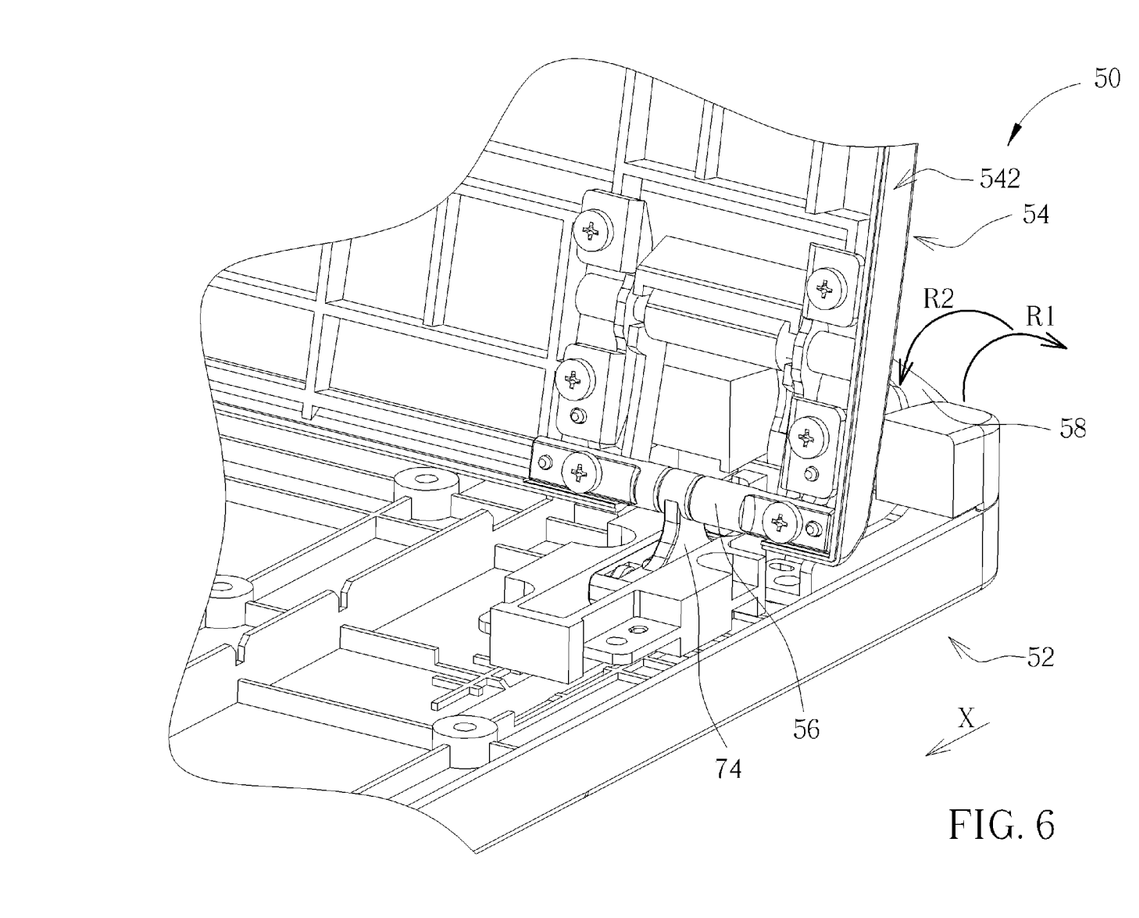

Please refer to FIG. 1 to FIG. 6. FIG. 5 and FIG. 6 are respectively partial enlarged diagrams of FIG. 3 and FIG. 4 according to the embodiment of the present invention. The switch mechanism 70 includes a sliding track 72 disposed inside the host module 52, and a first groove 721 is formed on the sliding track 72 for containing the first switch component 60. The switch mechanism 70 further includes a sliding component 74, an end of the sliding component 74 is pivotally connected to the display module 54, and the other end of the sliding component 74 is slidably installed inside the sliding track 72. The sliding component 74 slides in a first direction (+X direction) relative to the sliding track 72 while the display module 54 rotates in a first rotary direction R1 relative to the host module 52. On the contrary, the sliding component 74 slides in a direction opposite to the first direction (+X direction) relative to the sliding track 72 while the display module 54 rotates in a second rotary direction R2 opposite to the first rotary direction R1 relative to the host module 52.

The switch mechanism 70 further includes an activation component 741 disposed on the sliding component 74. The activation component 741 is for moving to a first position corresponding to the first switch component 60 to activate the first switch component 60 while the sliding component 74 slides in the first direction (+X direction). For example, as the first switch component 60 is an activating switch, the activation component 741 can be a protruding structure correspondingly, so as to move to the first position corresponding to the first switch component 60 to push or press to activate the activating switch. As the first switch component 60 is a Hall Effect switch, the activation component 741 can be a magnetic component correspondingly, so as to move to the first position corresponding to the first switch component 60 to activate the Hall Effect switch. A mechanism of the activation component 741 for activating the first switch component 60 is not limited to the above embodiment, and it depends on practical design demand. Moreover, an end of the rotating component 56 is fixed on the rear cover 542 of the display module 54, and the other end of the rotating component 56 is pivotally connected to the sliding component 74. The rotating component 56 is for driving the sliding component 74 to slide inside the sliding track 72 as the display module 54 pivots relative to the host module 52.

Operational principle of the portable electronic device 50 of the embodiment is described as follows. As shown in FIG. 5, as the portable electronic device 50 is closed, the sliding component 74 is in the first position corresponding to the first switch component 60, and the activation component 741 can activate the first switch component 60, so as to switch the portable electronic device 50 into a suspend state or a power-off state. The operational states of the portable electronic device 50 can be set by software of the host module 52, or can be set before being dispatched from the factory. As users rotate the display module 54 in the first rotary direction R1 relative to the host module 52, the sliding component 74 is driven to slide in the first direction (+X direction), so that the sliding component 74 is separated from the first position. At this time, the portable electronic device 50 can be switched from the original power-off state or the suspend state into another state, such as a power-on state or a wake-up state. After that, as users finish working with the portable electronic device 50, users can rotate the display module 54 in the second rotary direction R2 relative to the host module 52, so that the sliding component 74 slides in the direction opposite to the first direction (+X direction). Finally, the sliding component 74 can move to the first position, and the activation component 741 on the sliding component 74 activates the first switch component 60 again, so that the portable electronic device 50 is switched from the power-on state into the power-off state or the suspend state. In the above embodiment, the mechanism of the activation component 741 for activating the first switch component 60 to switch different states is not limited to switch the states between the power-off state or the suspend state and the power-on state. For example, it can switch different power management modes, and it depends on practical design demand.

Figure 7:
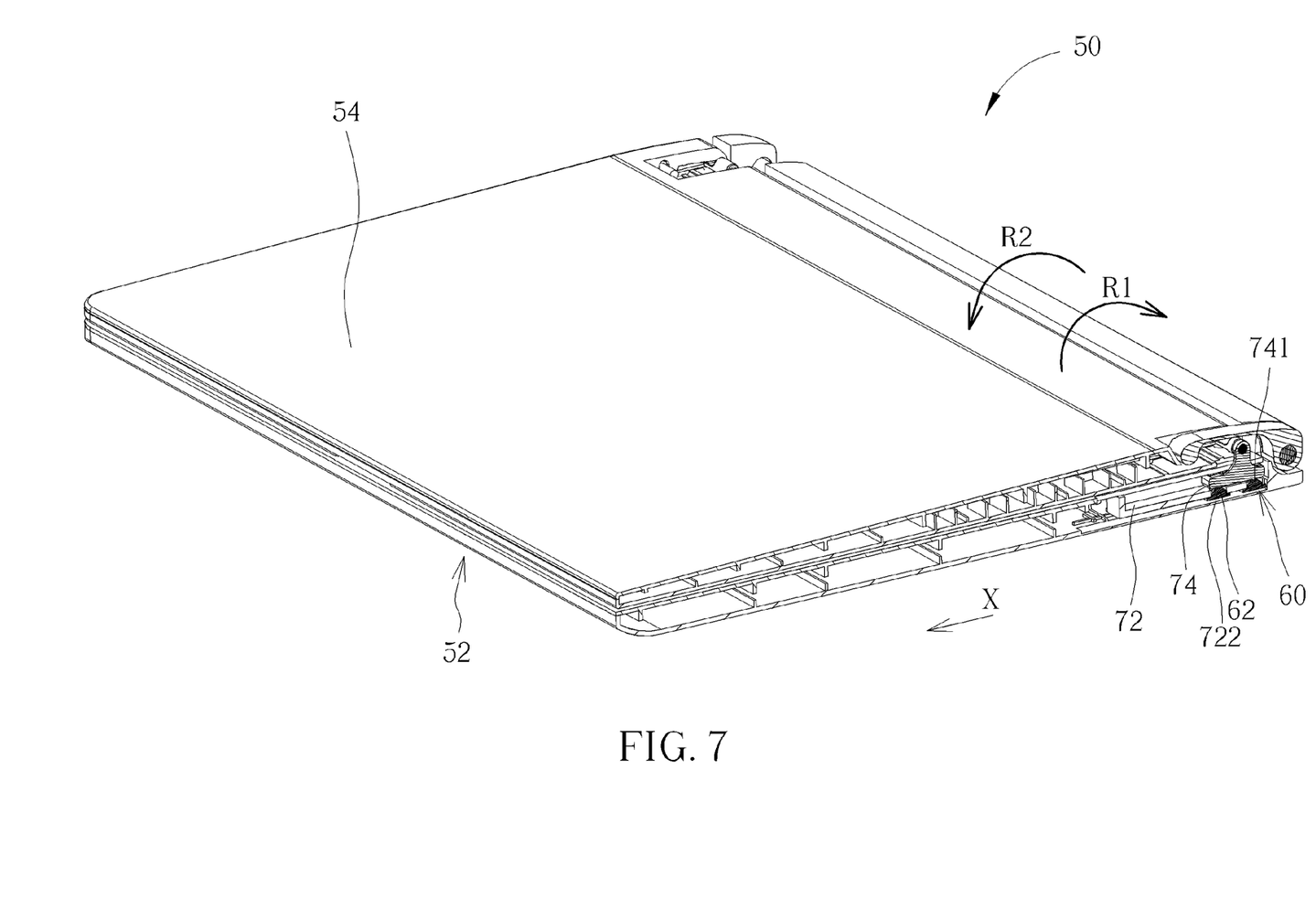
FIG. 7 and FIG. 8 are sectional views of the portable electronic device in different states according to another embodiment of the present invention.
Figure 8:
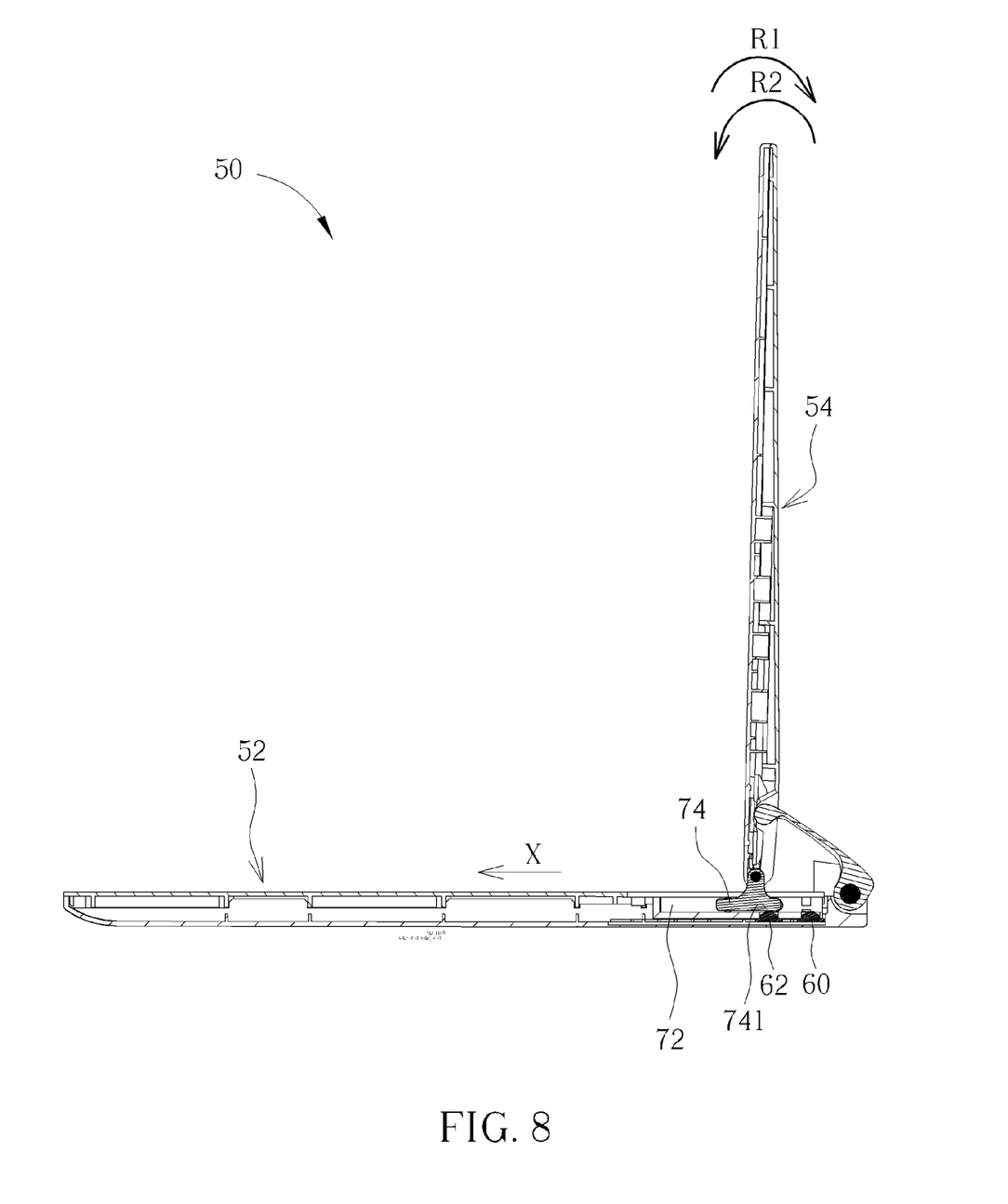

Please refer to FIG. 7 and FIG. 8. FIG. 7 and FIG. 8 are sectional views of the portable electronic device 50 in different states according to another embodiment of the present invention. In this embodiment, a second groove 722 is further formed on the sliding track 72 for containing a second switch component 62, and the activation component 741 moves to a second position corresponding to the second switch component 62 to activate the second switch component 62 while the sliding component 74 slides in the first direction (+X direction). As the portable electronic device 50 is closed as shown in FIG. 7, the sliding component 74 can be designed to be in the first position corresponding to the first switch component 60, and the activation component 741 can activate the first switch component 60, so that the portable electronic device 50 is switched into the power-off state or the suspend state. As users rotate the display module 54 in the rotary direction R1 relative to the host module 52, the sliding component 74 is driven to slide in the first direction (+X direction) to separate from the first position. Then, as the sliding component 74 moves to the second position as shown in FIG. 8, the activation component 741 on the sliding component 74 activates the second switch component 62, so that the portable electronic device 50 is switched from the power-off state or the suspend state into another state, such as the power-on state or the wake-up state.

As users finish working with the portable electronic device 50, users can rotate the display module 54 in the second rotary direction R2 relative to the host module 52, so that the sliding component 74 slides in the direction opposite to the first direction (+X direction). At this time, the activation component 741 may activate the second switch component 62 in the second position again. In this embodiment, a second activation can be set as an invalid activation as the second switch component 62 is activated continuously, and therefore the portable electronic device 50 is still in the power-on state. Finally, as the sliding component 74 moves to the first position, the activation component 741 on the sliding component 74 activates the first switch component 60 again, so that the portable electronic device 50 is switched from the power-on state into the power-off state or the suspend state again. The mechanism of the activation component 741 for activating the first switch component 60 and the second switch component 62 to switch different states is not limited to switch the states between the power-off state or the suspend state and the power-on state. For example, it can switch different power management modes, and it depends on practical design demand.

Figure 9:
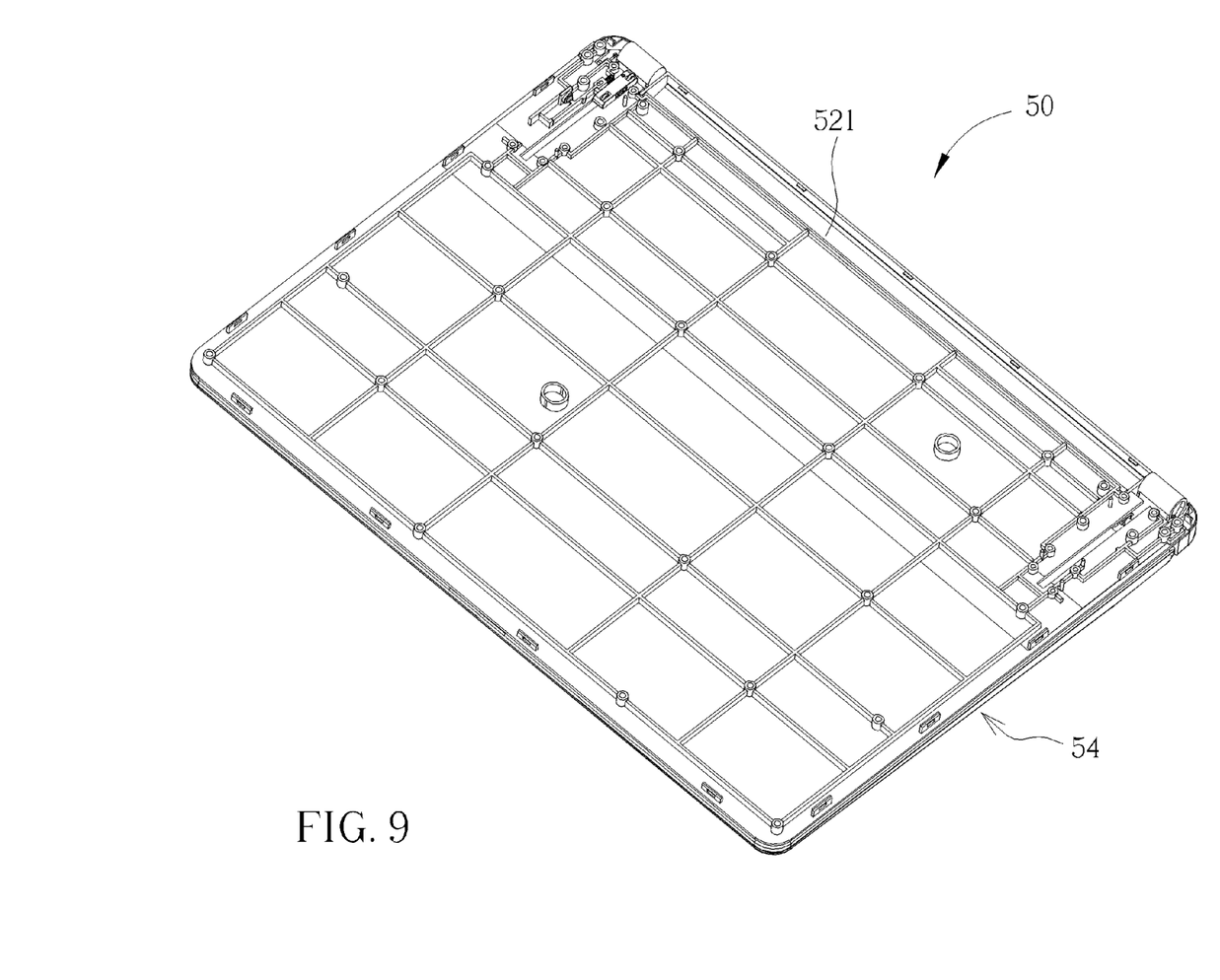
FIG. 9 is an inner structural diagram of the portable electronic device according to another embodiment of the present invention.
Figure 10:
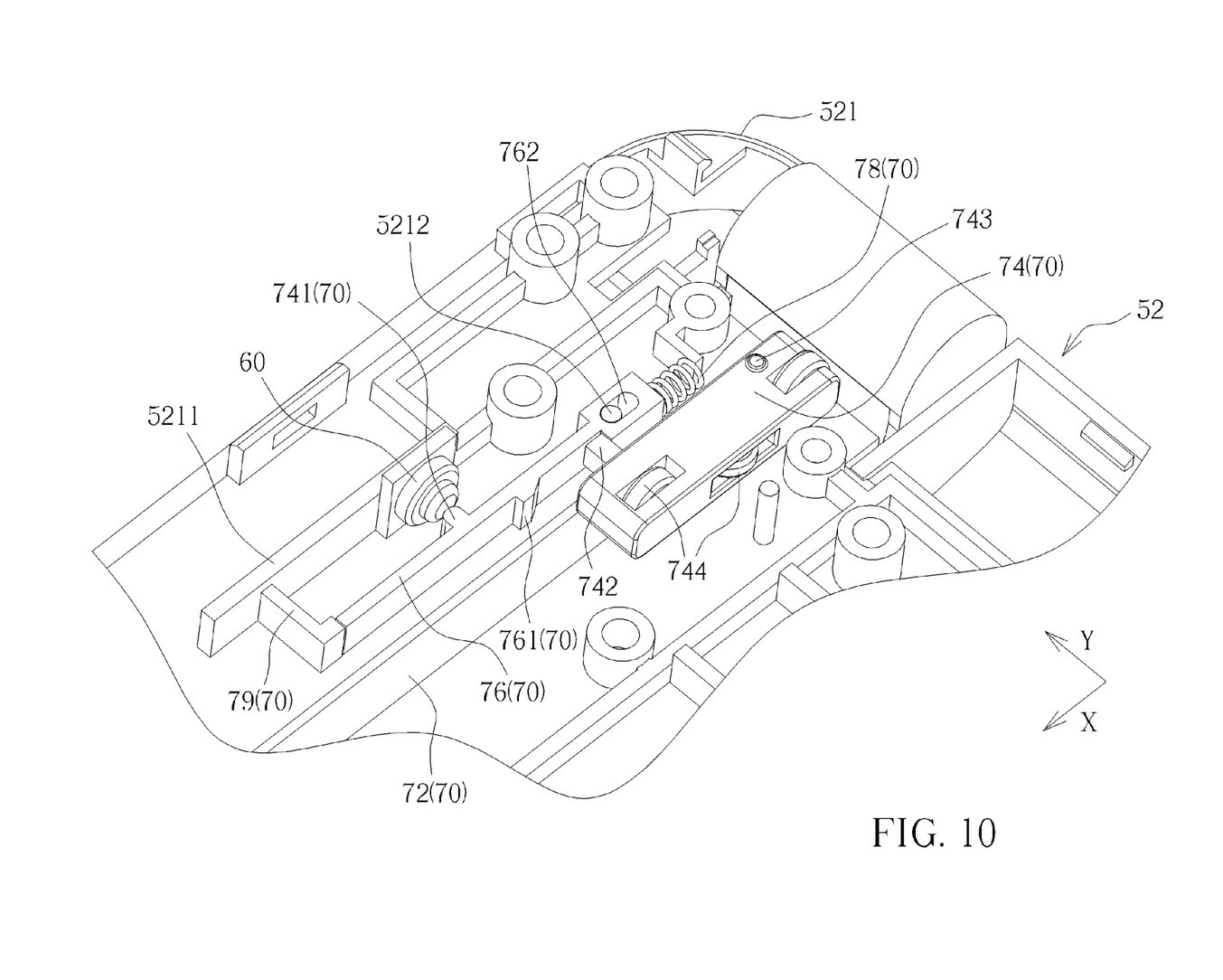
FIG. 10 and FIG. 11 are respectively partial enlarged diagrams of a switch mechanism in different states according to another embodiment of the present invention.
Figure 11:
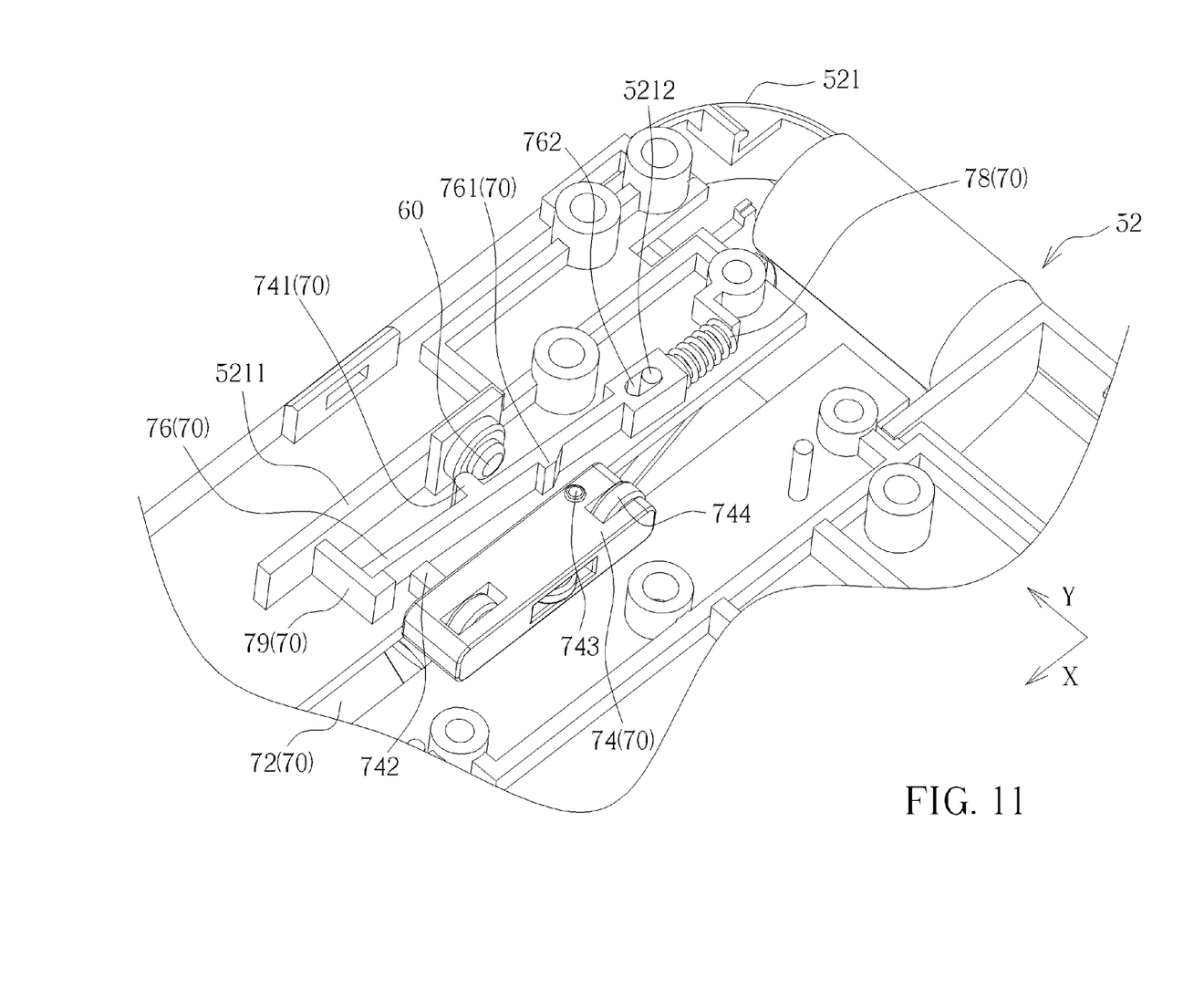

Please refer to FIG. 9 to FIG. 11. FIG. 9 is an inner structural diagram of the portable electronic device 50 according to another embodiment of the present invention. FIG. 10 and FIG. 11 are respectively partial enlarged diagrams of the switch mechanism 70 in different states according to another embodiment of the present invention. In this embodiment, the first switch component 60 is disposed on a side plate 5211 of the upper casing 521 of the host module 52. The sliding component 74 includes a pushing portion 742, and the switch mechanism 70 further includes a linkage rod 76. A protruding structure 761 is formed on a side of the linkage rod 76. In this embodiment, the linkage rod 76 can include an inclined surface. The activation component 741 is disposed on the other side of the linkage rod 76, and the pushing portion 742 contacts against an end of the linkage rod 76 as the sliding component 74 is in an initial position. The switch mechanism 70 further includes a resilient component 78 connected to the end of the linkage rod 76. The resilient component 78 drives the linkage rod 76 to move in the first direction (+X direction) as the sliding component 74 moves in the first direction (+X direction) and separates from the linkage rod 76, and the pushing portion 742 of the sliding component 74 is for pushing the protruding structure 761 of the linkage rod 76, so as to drive the activation component 741 to move in a second direction (+Y direction) to activate the first switch component 60 as the sliding component 74 moves in the first direction (+X direction), so that the portable electronic device 50 can be switched into different states.

As the sliding component 74 moves in the first direction (+X direction) and separates from the linkage rod 76, and the pushing portion 742 pushes the protruding structure 761 of the linkage rod 76, the resilient component 78 and the pushing portion 742 cooperatively drive the linkage rod 76 to move in the first direction (+X direction) and the second direction (+Y direction). That is, the linkage rod 76 is forced by a resilient force of the resilient component 78 in the first direction (+X direction) and by a pushing force of the pushing portion 742 in the second direction (+Y direction) to move in the first direction (+X direction) and the second direction (+Y direction). In addition, a guiding pillar 5212 is disposed on the upper casing 521, and a slot 762 is formed on the linkage rod 76 for containing the guiding pillar 5212 of the upper casing 521 of the host module 52 for guiding a movement of the linkage rod 76. That is, the linkage rod 76 can move in the first direction (+X direction) stably.

The switch mechanism 70 further includes a stop portion 79 disposed on the side plate 5211 of the upper casing 521 of the host module 52. As shown in FIG. 11, the stop portion 79 is for stopping the other end of the linkage rod 76 after the activation component 741 activates the first switch component 60. That is, the linkage rod 76 is forced by the resilient force of the resilient component 78 in the first direction (+X direction) and by the pushing force of the pushing portion 742 in the second direction (+Y direction) to move in the first direction (+X direction) and the second direction (+Y direction), as shown in FIG. 11, the other end of the linkage rod 76 is stopped by an inner side of the stop portion 79. As a result, the pushing portion 742 of the sliding component 74 does not contact the protruding structure 761 of the linkage rod 76 as the display module 54 pivots in the second rotary direction R2 relative to the host module 52 and the sliding component 74 slides in the direction opposite to the first direction (+X direction), so that the activation component 741 does not activate the first switch component 60 again. The pushing portion 742 of the sliding component 74 contacts against the end of the linkage rod 76 until the sliding component 74 returns to the initial position as shown in FIG. 10, so that the other end of the linkage rod 76 is separated from the stop portion 79 to facilitate next activation.

Figure 12:
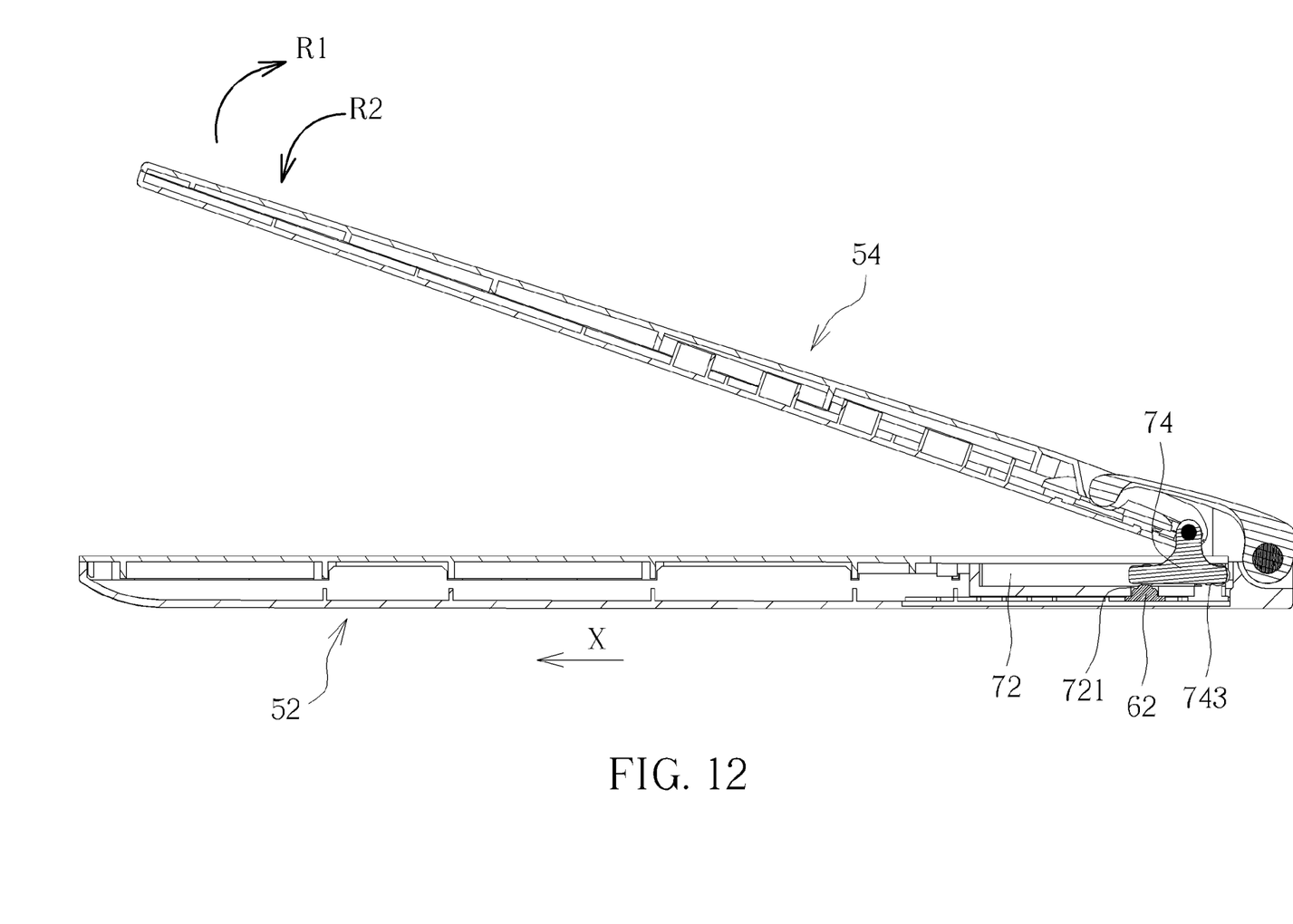
FIG. 12 is a sectional view of the portable electronic device according to another embodiment of the present invention.

Please refer to FIG. 9 to FIG. 12. FIG. 12 is a sectional view of the portable electronic device 50 according to another embodiment of the present invention. The mechanism of the activating switch component in the previous embodiment can be combined with one of this embodiment. That is, the second switch component 62 in the previous embodiment can be added to this embodiment, and the second switch component 62 is installed inside the host module 52. As shown in FIG. 10, an actuating portion 743 is disposed on the sliding component 74. In this embodiment, the first groove 721 of the sliding track 72 is for containing the second switch component 62, and the actuating portion 743 moves to the second position corresponding to the second switch component 62 to activate the second switch component 62 while the sliding component 74 slides in the first direction (+X direction). Similar with the previous embodiment, as users desire to open the closed portable electronic device 50, the sliding component 74 moves from the initial position illustrated in FIG. 10 along the sliding track 72 in the first direction (+X direction), and then pushing portion 742 of the sliding component 74 moves to push the protruding structure 761 of the linkage rod 76, so that the linkage rod 76 moves in the second direction (+Y direction). At this time, the activation component 741 on the linkage rod 76 contacts the first switch component 60.

After that, the linkage rod 76 is forced by the resilient force of the resilient component 78 in the first direction (+X direction) and by the pushing force of the pushing portion 742 in the second direction (+Y direction) to move in the first direction (+X direction) and the second direction (+Y direction), as shown in FIG. 11, and the other end of the linkage rod 76 is stopped by the inner side of the stop portion 79 finally. As the sliding component 74 keeps moving to the second position in the first direction (+X direction), the actuating portion 743 on the sliding component 74 is to activate the second switch component 62. On the contrary, as users desire to close the portable electronic device 50, the sliding component 74 moves in the direction opposite to the first direction (+X direction), and the actuating portion 743 can be designed to activate the second switch component 62 as the sliding component 74 returns to the second position. The pushing portion 742 of the sliding component 74 contacts against the end of the linkage rod 76 until the sliding component 74 returns to the initial position as shown in FIG. 10, so that the other end of the linkage rod 76 is separated from the stop portion 79 to facilitate the next activation. The mechanism of the activation component 741 for activating the first switch component 60 and the actuating portion 743 for activating the second switch component 62 to switch different states is not limited to switch the states between the power-off state or the suspend state and the power-on state. For example, it can switch different power management modes, and it depends on practical design demand.

Moreover, in the embodiments described above, the sliding component 74 can selectively include at least one wheel 744. As shown in FIG. 10 and FIG. 11, the wheel 744 slidably contacts an inner side of the sliding track 72, so that the sliding component 74 slides inside the sliding track 72 smoothly and stably.

In contrast to the prior art, the switch mechanism and the portable electronic device therewith can switch a system of the portable electronic device into different states, such as the suspend state, the power-off state and the power-on state, by pivoting the display module relative to the host module to a predetermined angle. Because the activation component and the actuating portion of the switch mechanism are disposed inside the host module instead of the display module, so that it can save a limited mechanical space of the display module. In addition, because both the activation component and switch components are disposed in the host module, the predetermined activating angle of the switch components is not affected by material of the portable electronic device, so as to activate the switch components more accurately to improve lack of accuracy of activation as the casing of the notebook computer is made of non-plastic material, such as metal, to affect the magnetic field intensity of the Hall effect sensor.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A switch mechanism, comprising:
   a sliding track disposed inside a host module;
   a sliding component, an end of the sliding component being pivotally connected to a display module and the other end of the sliding component being slidably installed inside the sliding track, and the sliding component sliding in a first direction relative to the sliding track while the display module rotates in a first rotary direction relative to the host module; and
   an activation component for moving to a first position corresponding to a first switch component to activate the first switch component while the sliding component slides in the first direction.

2. The switch mechanism of claim 1, wherein the activation component is disposed on the sliding component, and a first groove is formed on the sliding track for containing the first switch component.

3. The switch mechanism of claim 2, wherein a second groove is further formed on the sliding track for containing a second switch component, and the activation component moves to a second position corresponding to the second switch component to activate the second switch component while the sliding component slides in the first direction.

4. The switch mechanism of claim 1, wherein the sliding component comprises a pushing portion, and the switch mechanism further comprises:
   a linkage rod, a protruding structure being formed on a side of the linkage rod, the activation component being disposed on the other side of the linkage rod, and the pushing portion contacting against the linkage rod; and
   a resilient component connected to an end of the linkage rod, the resilient component driving the linkage rod as the sliding component moves in the first direction and separates from the linkage rod, and the pushing portion of the sliding component being for pushing the protruding structure of the linkage rod, so as to drive the activation component to activate the first switch component.

5. The switch mechanism of claim 4, wherein the resilient component forces the linkage rod in the first direction as the sliding component moves in the first direction and separates from the linkage rod and the pushing portion pushes the protruding structure of the linkage rod, and the pushing portion forces the linkage rod, so that the activation component activates the first switch component in a second direction.

6. The switch mechanism of claim 5, wherein the first direction is substantially vertical to the second direction.

7. The switch mechanism of claim 4, further comprising a stop portion for stopping the other end of the linkage rod after the activation component activates the first switch component, so that the pushing portion of the sliding component does not contact the protruding structure of the linkage rod as the display module pivots in a second rotary direction relative to the host module and the sliding component slides in a direction opposite to the first direction.

8. The switch mechanism of claim 4, wherein an actuating portion is disposed on the sliding component, a first groove is formed on the sliding track for containing a second switch component, and the actuating portion moves to a second position corresponding to the second switch component to activate the second switch component while the sliding component slides in the first direction.

9. The switch mechanism of claim 4, wherein a guiding pillar is disposed on the host module, and a slot is formed on the linkage rod for containing the guiding pillar for guiding a movement of the linkage rod.

10. The switch mechanism of claim 1, wherein the sliding component comprises at least one wheel contacting against an inner side of the sliding track.

11. A portable electronic device comprising:
a host module;
a display module pivoted to the host module;
a first switch component installed inside the host module; and
a switch mechanism for activating the first switch component while the display module pivots relative to the host module, the switch mechanism comprising:
a sliding track disposed inside the host module;
a sliding component, an end of the sliding component being pivotally connected to the display module and the other end of the sliding component being slidably installed inside the sliding track, and the sliding component sliding in a first direction relative to the sliding track while the display module rotates in a first rotary direction relative to the host module; and
an activation component for moving to a first position corresponding to the first switch component to activate the first switch component while the sliding component slides in the first direction.

12. The portable electronic device of claim 11, wherein the activation component is disposed on the sliding component, and a first groove is formed on the sliding track for containing the first switch component.

13. The portable electronic device of claim 12, wherein a second groove is further formed on the sliding track for containing a second switch component, and the activation component moves to a second position corresponding to the second switch component to activate the second switch component while the sliding component slides in the first direction.

14. The portable electronic device of claim 11, wherein the sliding component comprises a pushing portion, and the switch mechanism further comprises:
a linkage rod, a protruding structure being formed on a side of the linkage rod, the activation component being disposed on the other side of the linkage rod, and the pushing portion contacting against the linkage rod; and
a resilient component connected to an end of the linkage rod, the resilient component driving the linkage rod as the sliding component moves in the first direction and separates from the linkage rod, and the pushing portion of the sliding component being for pushing the protruding structure of the linkage rod, so as to drive the activation component to activate the first switch component.

15. The portable electronic device of claim 14, wherein the resilient component forces the linkage rod in the first direction as the sliding component moves in the first direction and separates from the linkage rod and the pushing portion pushes the protruding structure of the linkage rod, and the pushing portion forces the linkage rod, so that the activation component activates the first switch component in a second direction.

16. The portable electronic device of claim 14, further comprising a stop portion for stopping the other end of the linkage rod after the activation component activates the first switch component, so that the pushing portion of the sliding component does not contact the protruding structure of the linkage rod as the display module pivots in a second rotary direction relative to the host module and the sliding component slides in a direction opposite to the first direction.

17. The portable electronic device of claim 14, further comprising a second switch component installed inside the host module, wherein an actuating portion is disposed on the sliding component, a first groove is formed on the sliding track for containing a second switch component, and the actuating portion moves to a second position corresponding to the second switch component to activate the second switch component while the sliding component slides in the first direction.

18. The portable electronic device of claim 14, wherein a guiding pillar is disposed on the host module, and a slot is formed on the linkage rod for containing the guiding pillar for guiding a movement of the linkage rod.

19. The portable electronic device of claim 11, further comprising at least one rotating component, an end of the at least one rotating component being fixed on the display module and the other end of the at least one rotating component being pivotally connected to the sliding component, and the at least one rotating component being for driving the sliding component to slide inside the sliding track as the display module pivots relative to the host module.

20. The portable electronic device of claim 11, further comprising a supporting arm, an end of the supporting arm being pivotally connected to the display module and the other end of the supporting arm being pivotally connected to the host module, so that the display module pivots relative to the host module.

* * * * *